Patented July 29, 1947

2,424,768

UNITED STATES PATENT OFFICE 2,424,768

CAR SQUEEZE

Peter Nalbandian, Fresno, Calif., assignor to Improved Carloading Company, Fresno, Calif., a co-partnership Application June 18, 1945, Serial No. 600,200

3 Claims. (Cl. 105—369)

This invention relates to a car squeeze, and has for one of its objects the provision of a car squeeze that is rugged, powerful, quick acting, and that has a wider range of movement than heretofore.

Another object of the invention is the provision of a portable car squeeze having provision for actuation thereof at high and low speed and that is adapted to be extended from a minimum width that is less than the ordinary minimum width of a car press to substantially double the said minimum width.

A still further object of the invention is the provision of an improved, fast acting car squeeze.

Other objects and advantages will appear in the description and drawings.

Figure 1:
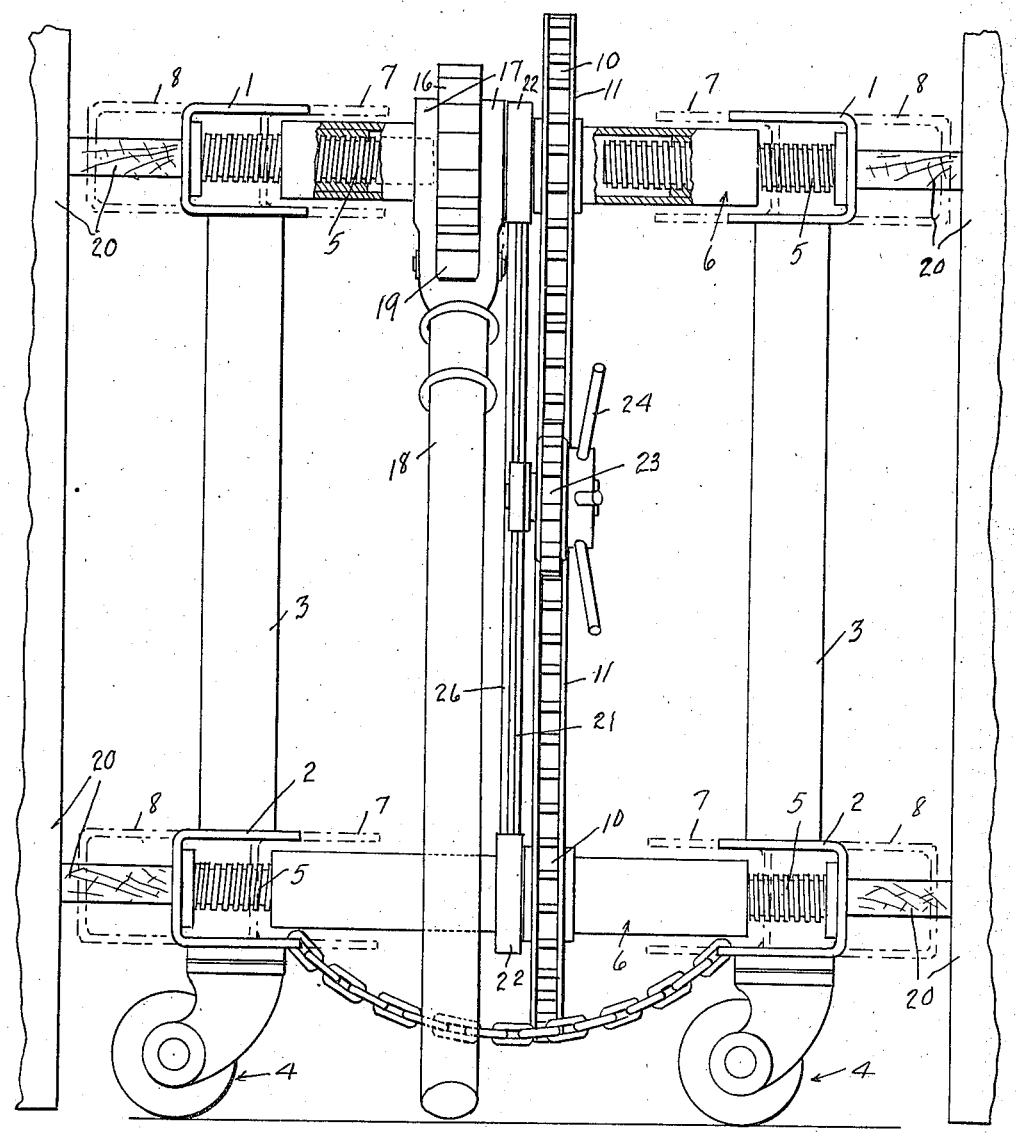
Fig. 1 is an end view of the car squeeze, several horizontal and vertical timbers being indicated at opposite sides substantially as they might be used in a car against the load in opposite ends of the car.

In detail, the car squeeze illustrated herein comprises a pair of upper horizontally extending, parallel, spaced, elongated, channel members 1 having their open sides facing each other, and a similar pair of lower channel members 2 spaced below said upper members.

The pairs of members 1, 2 are held in vertically spaced relation by posts 3 to which they may be welded, a pair or more of said posts extending between each upper member and the one therebelow.

Caster wheels 4 may support the members 2 above the floor of the car for movement of said members toward or away from each other, and for wheeling the press to a position in a car or wherever desired.

Secured to the bottom of each channel member 1, 2 is a pair of screws 5. These screws are spaced apart in each channel member and are parallel and project from the open sides of the channels. Preferably said screws are near the ends of the channel members and the pair of screws on each member are coaxial with the pair of screws on the member opposite thereto.

Extending between each pair of coaxial screws is a sleeve 6 provided at its ends with right and left hand threads respectively engaging such screws so that rotation of said sleeves in one direction will move the channel members 1, 2 at each side of the squeeze toward each other while rotation of said sleeves in the opposite direction will cause movement of said members away from each other. These sleeves are adapted to extend at their ends into the open sides of said channel members thus permitting the members of the upper and lower pairs to move together to fairly close relation. The dot-dash positions 7 in Fig. 1 show the members 1, 2 the minimum distance apart, while dot-dash positions 8 show them at about their maximum practical distance apart.

Secured on each sleeve 6 is a sprocket wheel 10. Sprocket wheels 10 are all of the same size, and an endless chain 11 connects all of said sprocket wheels for rotation simultaneously in the same direction according to whichever direction the chain is moved. Thus by moving the chain 11 in one direction the members 1 will be moved toward each other or toward retracted position 7, while movement of the chain in the opposite direction will cause movement of the members toward extended position 8.

Secured on one of the upper sleeves 6, specifically designated 15, is a ratchet wheel 16 between the arms 17 of a yoke that is on one end of a manually actuatable handle or arm 18. The arms 17 are rotatably supported on said sleeve 15 and the yoke carries a releasable pawl 19 adapted to engage the teeth of the ratchet wheel upon oscillation of handle 18 for causing rotation of sleeve 15 so that chain 11 will effect movement of the members 1 in a direction toward extended position 8 and against the timbers 20 that are against the load in opposite ends of the car.

Between sleeve 15 and the sleeve 6 that is directly below it is a strip 21 that is secured at its opposite ends to bearings 22 through which sleeves 15, 6 rotatably extend. Rotatably supported on a bracket on said strip about midway between the said sleeves is a sprocket wheel 23 that carries hand spokes 24 for quick manual rotation of said sprocket wheel. Thus, to release the members 1 from load squeezing position so as to remove the car squeeze or to position more timbers between the members 1 and the load, it is only necessary for the operator to rotate said sprocket wheel 23, which can be done very rapidly. The pawl 19 is, of course, released when this is done. Also if quick movement of the members 1 toward extended position is desired the sprocket wheel 23 can rapidly be rotated to accomplish this end.

By means of the hand operated sprocket wheel 23 and the pawl and ratchet arrangement, means is provided for moving members 1 at fast speed toward either position 7 or 8 and a slow but powerful movement of the members 1 toward extended position 8 is provided.

Figure 2:
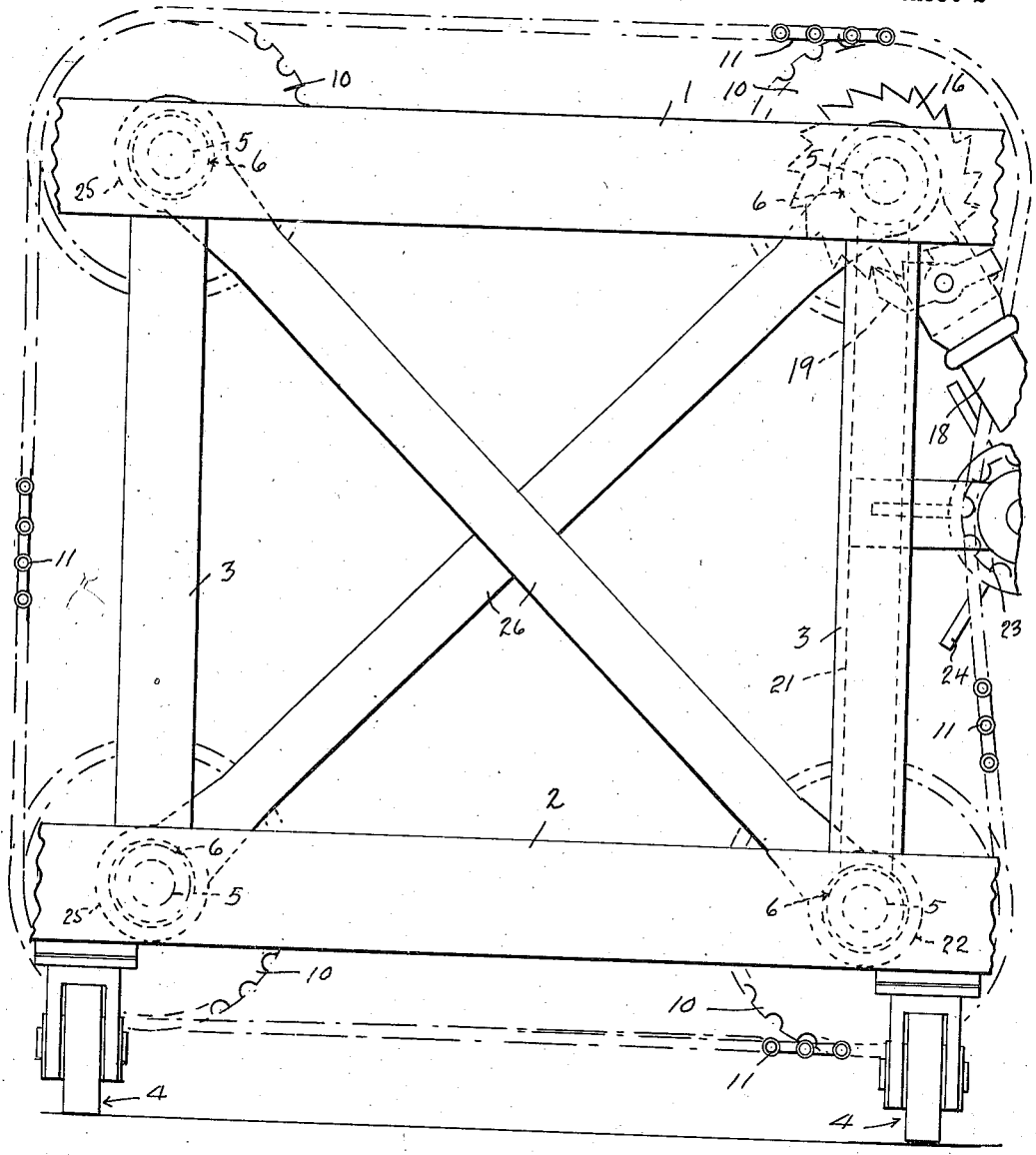
Fig. 2 is a side-elevational view of the car squeeze with parts broken off to accommodate the view to the sheet.

Bearings 25 which are similar to bearings 22, are provided on the sleeves 6 that are at the other end of the car squeeze from the sleeve 15, and braces 26 extend diagonally in crossing relation (Fig. 2) between the bearings on the sleeves at opposite ends of the car squeeze so as to brace the sleeves adjacent the sprockets where the strain would otherwise tend to spring the sleeves inwardly or generally toward the center of the car squeeze.

In operation, assuming that cased goods such as lug boxes of fruit are stacked in opposite ends of the car to the doorway, vertical posts such as vertical members 20 in Fig. 1, may be placed so as to span the adjacent corners of pairs of stacks, and the car squeeze may then be placed between the posts that are against the load in said ends of the car and the members 1 are moved toward extended position 8 from retracted position 7 to squeeze the cases in opposite ends of the car tightly together toward the opposite end walls of the car. It may be that additional horizontal timbers, such as also indicated at 20 in Fig. 1, may ultimately be required to effect the desired tightness in the load. After the load is tightly packed in the car, cross timbers may be inserted and secured in place between the end loads to prevent loosening after the car squeeze is removed.

It is to be understood that the illustrations and description are not to be considered restrictive of the invention, but merely illustrative thereof.

I claim:

1. A car squeeze comprising an upper and a lower pair of horizontally extending parallel channel members, the members of each pair being horizontally spaced apart with their open sides facing each other, means supporting the members of the upper pair spaced from the members of the lower pair and directly over the latter members, screw means connecting the members of each pair actuatable for simultaneously moving the members of both pairs toward and away from each other, means connecting with said screw means for simultaneously actuating the same, said screw means including coaxial pairs of screws extending through the open sides of said members and secured to their bottoms, sleeves movable into and out of said open sides and extending between each pair of coaxial screws, said sleeves being provided with threads at their ends in threaded engagement with said screws.

2. A car squeeze comprising an upper and a lower pair of horizontally extending parallel channel members, the members of each pair being horizontally spaced apart with their open sides facing each other, means supporting the members of the upper pair spaced from the members of the lower pair and directly over the latter members, screw means connecting the members of each pair actuatable for simultaneously moving the members of both pairs toward and away from each other, means connecting with said screw means for simultaneously actuating the same, said screw means including coaxial pairs of screws extending through the open sides of said members and secured to their bottoms, sleeves movable into and out of said open sides and extending between each pair of coaxial screws said sleeves being provided with threads at their ends in threaded engagement with said screws, the means for actuating said screw means comprising a sprocket wheel carried by each of said sleeves and an endless chain connecting all of such sprocket wheels for simultaneous rotation of said sprocket wheels in the same direction upon rotating any one sprocket wheel.

3. A car squeeze comprising an upper and a lower pair of horizontally extending parallel elongated members, the members of each pair being horizontally spaced apart and the members of the upper pair being directly over the members of the lower pair, screw means connecting the members of each pair actuatable for simultaneously moving the members of both pairs toward and away from each other, including rotary sleeves respectively extending horizontally between said upper and lower pairs and screws carried by said members in threaded engagement with said sleeves, braces rotatably secured to said sleeves and respectively extending between the sleeves that are between the upper pair of said members and the sleeves that are between the lower pair of said members, posts extending between the members of said upper pair and the members of said lower pair spacing the upper pair from said lower pair, and means for simultaneously rotating said sleeves in the same direction.

PETER NALBANDIAN.

REFERENCES CITED

The following references are of record in the file of this patent:

UNITED STATES PATENTS

| Number | Name | Date |
|---|---|---|
| 1,838,472 | Barrett | Dec. 29, 1931 |
| 1,851,461 | Stebler | Mar. 29, 1932 |
| 2,017,301 | Wynn | Oct. 15, 1935 |
| 2,252,283 | Brase | Aug. 12, 1941 |